US012264809B1

(12) United States Patent
Crawmer

(10) Patent No.: US 12,264,809 B1
(45) Date of Patent: Apr. 1, 2025

(54) RETRACTABLE LIGHT FIXTURE

(71) Applicant: Justin Crawmer, Newark, OH (US)

(72) Inventor: Justin Crawmer, Newark, OH (US)

( * ) Notice: Subject to any disclaimer, the term of this patent is extended or adjusted under 35 U.S.C. 154(b) by 0 days.

(21) Appl. No.: 18/883,278

(22) Filed: Sep. 12, 2024

(51) Int. Cl.
*F21V 21/38* (2006.01)
*F21V 21/15* (2006.01)

(52) U.S. Cl.
CPC .............. *F21V 21/38* (2013.01); *F21V 21/15* (2013.01)

(58) Field of Classification Search
CPC .......... F21V 21/36; F21V 21/38; F21V 21/15; F21V 21/16; F21V 21/18; F21V 21/20
See application file for complete search history.

(56) References Cited

U.S. PATENT DOCUMENTS 2,391,936 A 1/1946 Wilson
2,907,872 A 10/1959 Wilson
4,803,606 A 2/1989 Rotter
5,655,833 A 8/1997 Raczynski
6,312,139 B1 11/2001 Baker
8,322,877 B1 12/2012 Merritt
D977,697 S 2/2023 Lu
2023/0354499 A1 11/2023 Borden
2024/0230071 A1 * 7/2024 Bley .................... F21V 21/108

FOREIGN PATENT DOCUMENTS

EP 0295958 12/1988

* cited by examiner

*Primary Examiner* — Sean P Gramling

(57) ABSTRACT

A retractable light fixture device includes a support panel which can be suspended from a horizontal support surface. A lifting unit is rotatably attached to the support panel and the lifting unit is actuatable to rotate in either a first direction or a second direction. A communication unit is attached to the support panel and is in wireless communication with a remote control thereby enabling the remote control to remotely actuate the lifting unit to rotate in either the first direction or the second direction. A light fixture is attached to the lifting unit and the light fixture is either lifted toward the support panel or lowered from the support panel when the lifting unit is actuated to rotate in the first direction or the second direction. In this way the light fixture can be lifted to accommodate an overhead door that is being urged into an open position.

10 Claims, 8 Drawing Sheets

RETRACTABLE LIGHT FIXTURE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to light fixture devices and more particularly pertains to a new light fixture for enabling a light fixture to be raised to accommodate an overhead door or lowered to brightly illuminate a work area. The device includes a support panel that can be suspended from a ceiling and a lifting unit rotatably integrated into the support panel and a light fixture attached to the lifting unit which can either be lowered from the support panel or lifted against the support panel. The device includes a remote control for remotely controlling the lifting unit and the light fixture.

(2) Description of Related Art Including Information Disclosed Under 37 CFR 1.97 and 1.98

The prior art relates to light fixture devices including: a raising and lowering device that includes a series of pulleys and a cable extending around the series of pulleys and plurality of light fixtures attached to the cable and a counter weight attached to the cable for either raising or lowering the light fixtures; a fluorescent light fixture device that includes a light fixture that is suspended from a pair of cables and a plurality of motors which serve to either raise or lower the cables for lifting or lowering the light fixture; a variety of movable light fixture devices that each at least includes a framework and a light fixture slidably mounted to the framework to enable the light fixture to be located at various points on the framework. In no instance does the prior art disclose a retractable light fixture device that includes a support panel which is suspended from a ceiling and a lifting unit movably attached to the support panel and a light fixture attached to the lifting unit and a remote control for remotely lifting or lowering the light fixture and for remotely turning the light fixture on and off.

BRIEF SUMMARY OF THE INVENTION

An embodiment of the disclosure meets the needs presented above by generally comprising a support panel which can be suspended from a horizontal support surface. A lifting unit is rotatably attached to the support panel and the lifting unit is actuatable to rotate in either a first direction or a second direction. A communication unit is attached to the support panel and is in wireless communication with a remote control thereby enabling the remote control to remotely actuate the lifting unit to rotate in either the first direction or the second direction. A light fixture is attached to the lifting unit and the light fixture is either lifted toward the support panel or lowered from the support panel when the lifting unit is actuated to rotate in the first direction or the second direction. In this way the light fixture can be lifted to accommodate an overhead door that is being urged into an open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
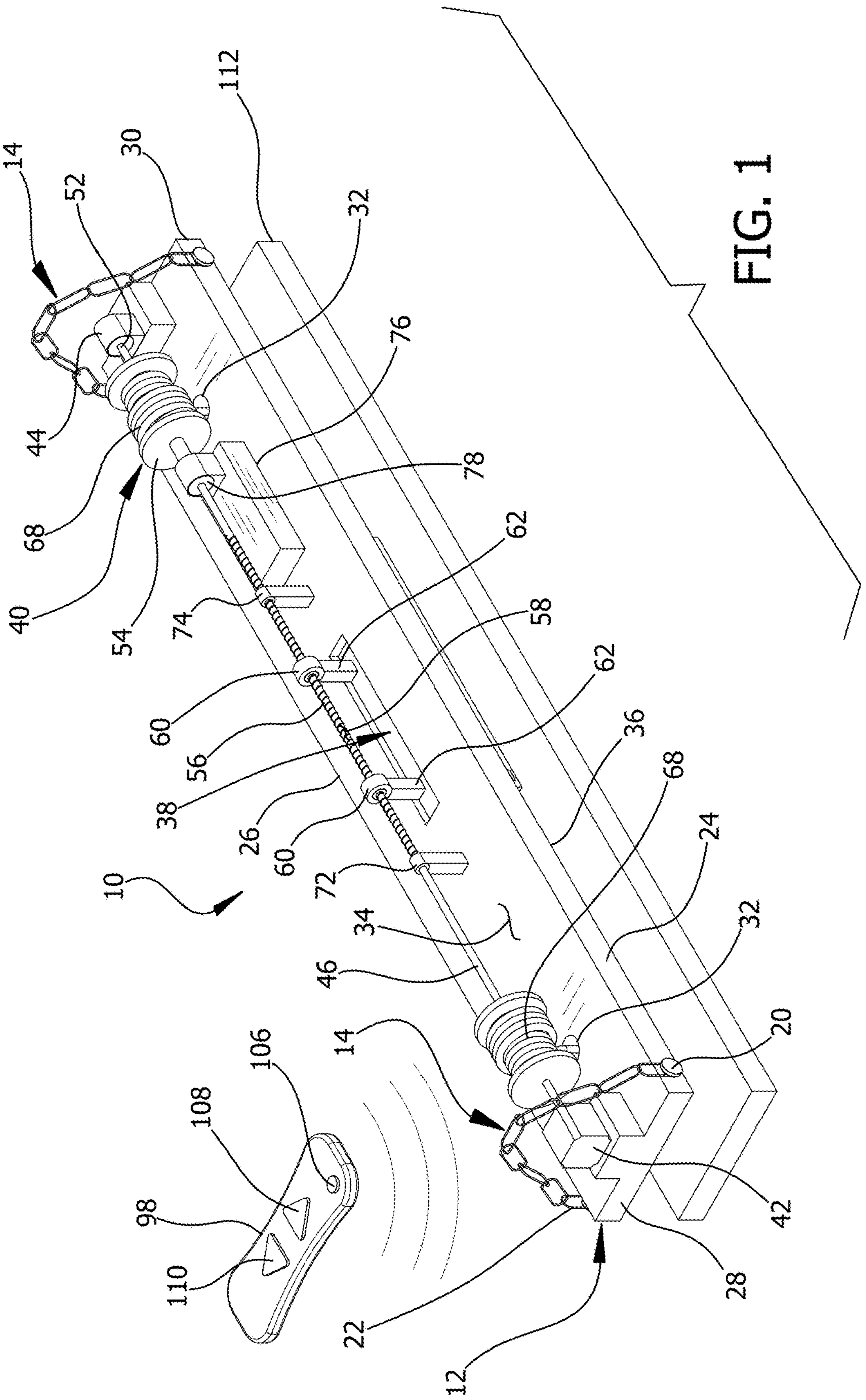
FIG. 1 is a top perspective view of a retractable light fixture according to an embodiment of the disclosure.
Figure 2:
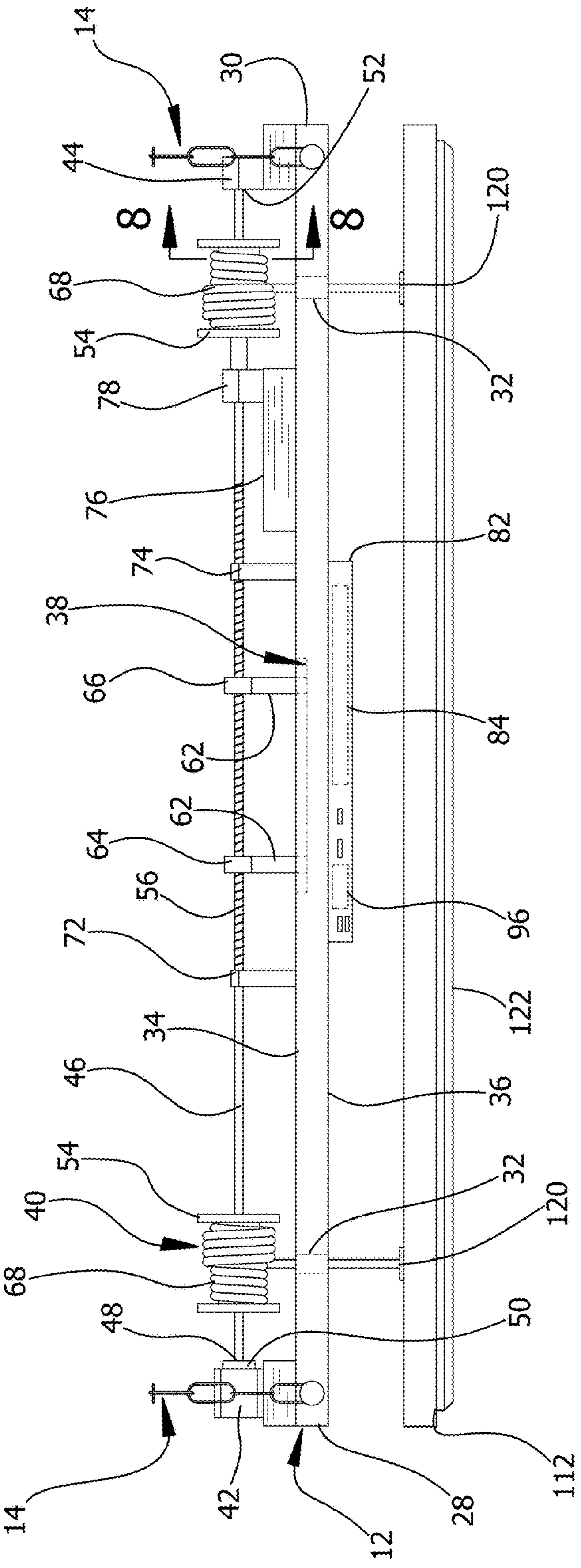
FIG. 2 is a front phantom view of an embodiment of the disclosure.
Figure 3:
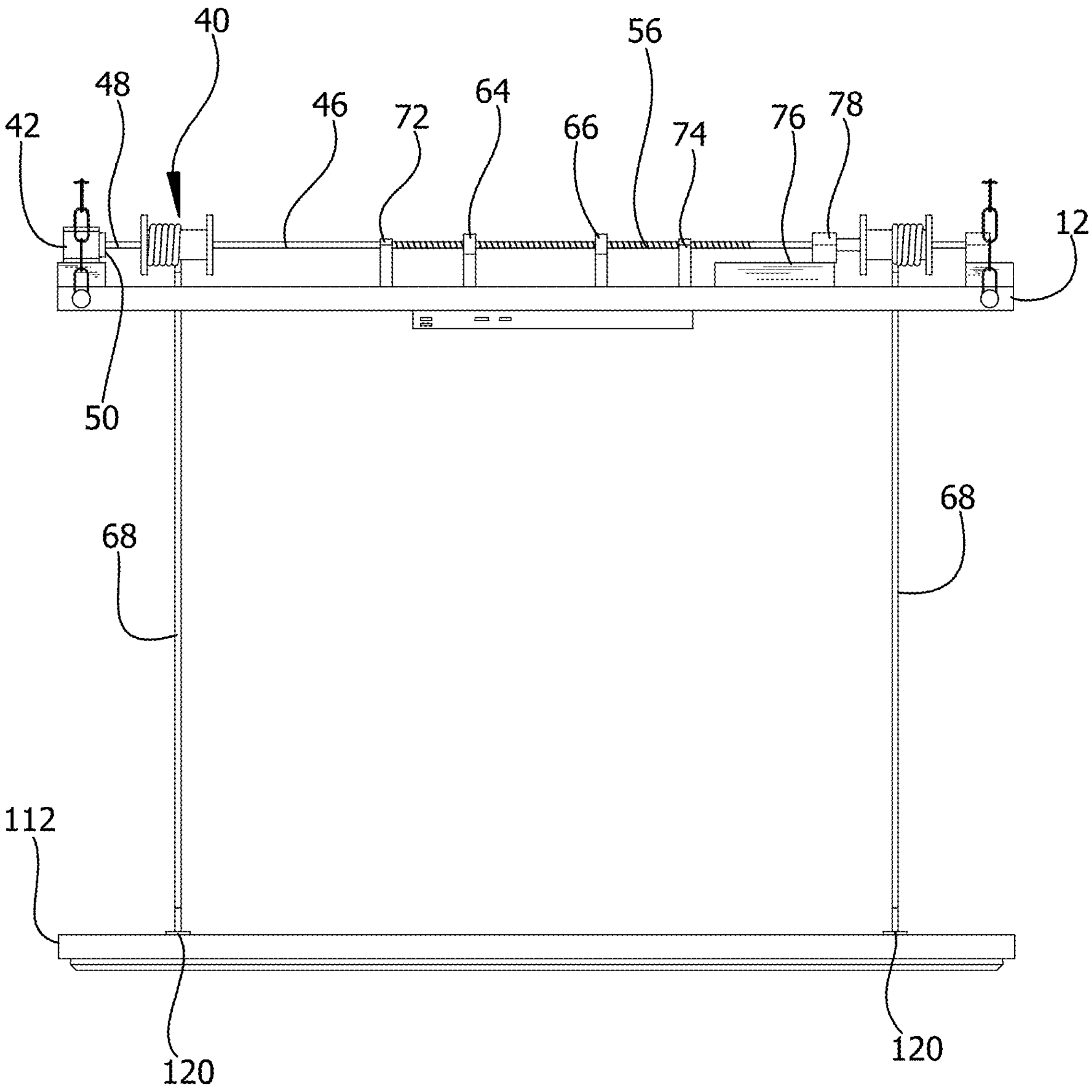
FIG. 3 is a front in-use view of an embodiment of the disclosure showing a light fixture being lowered from a support panel.
Figure 4:
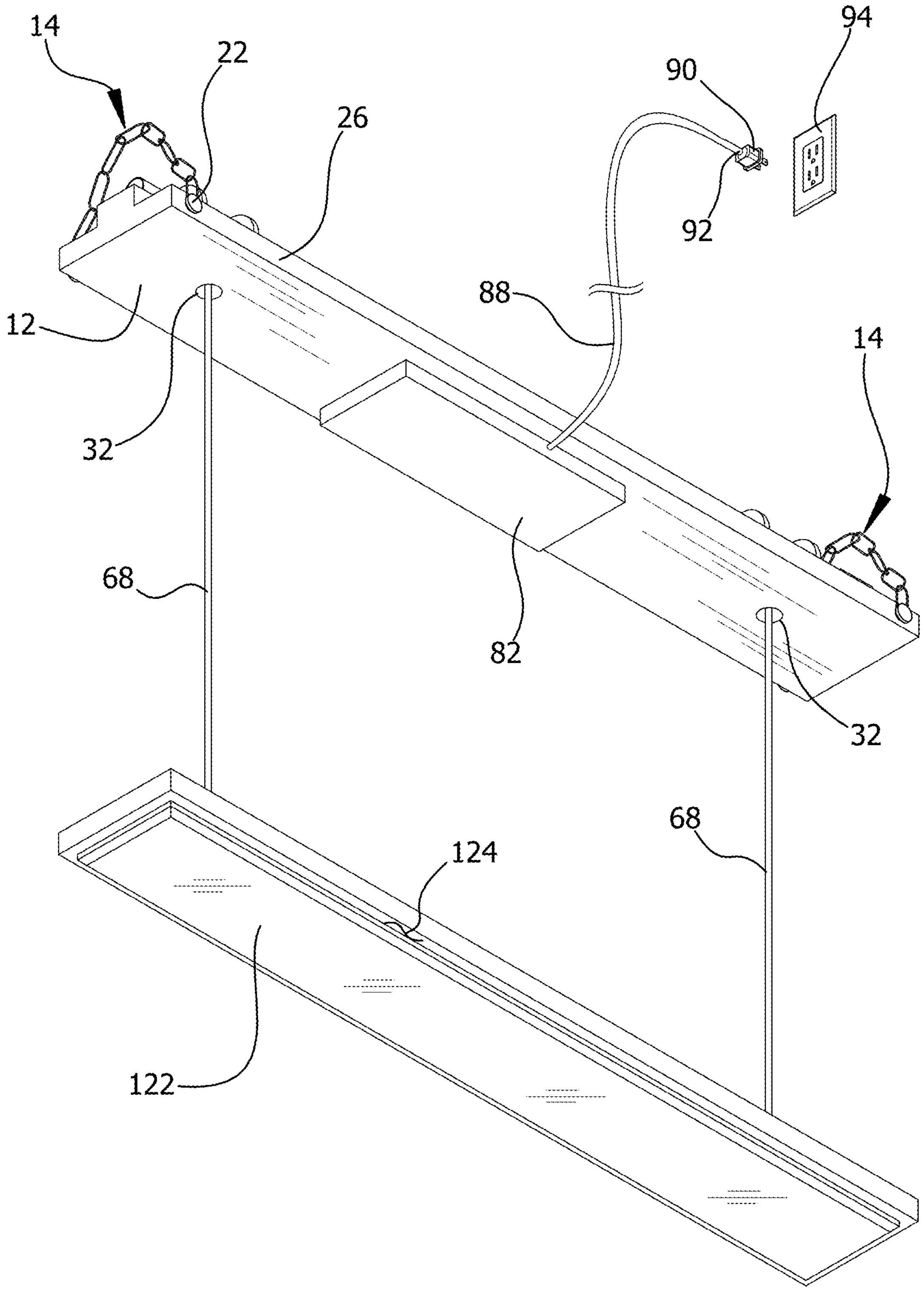
FIG. 4 is a bottom perspective view of an embodiment of the disclosure.
Figure 5:
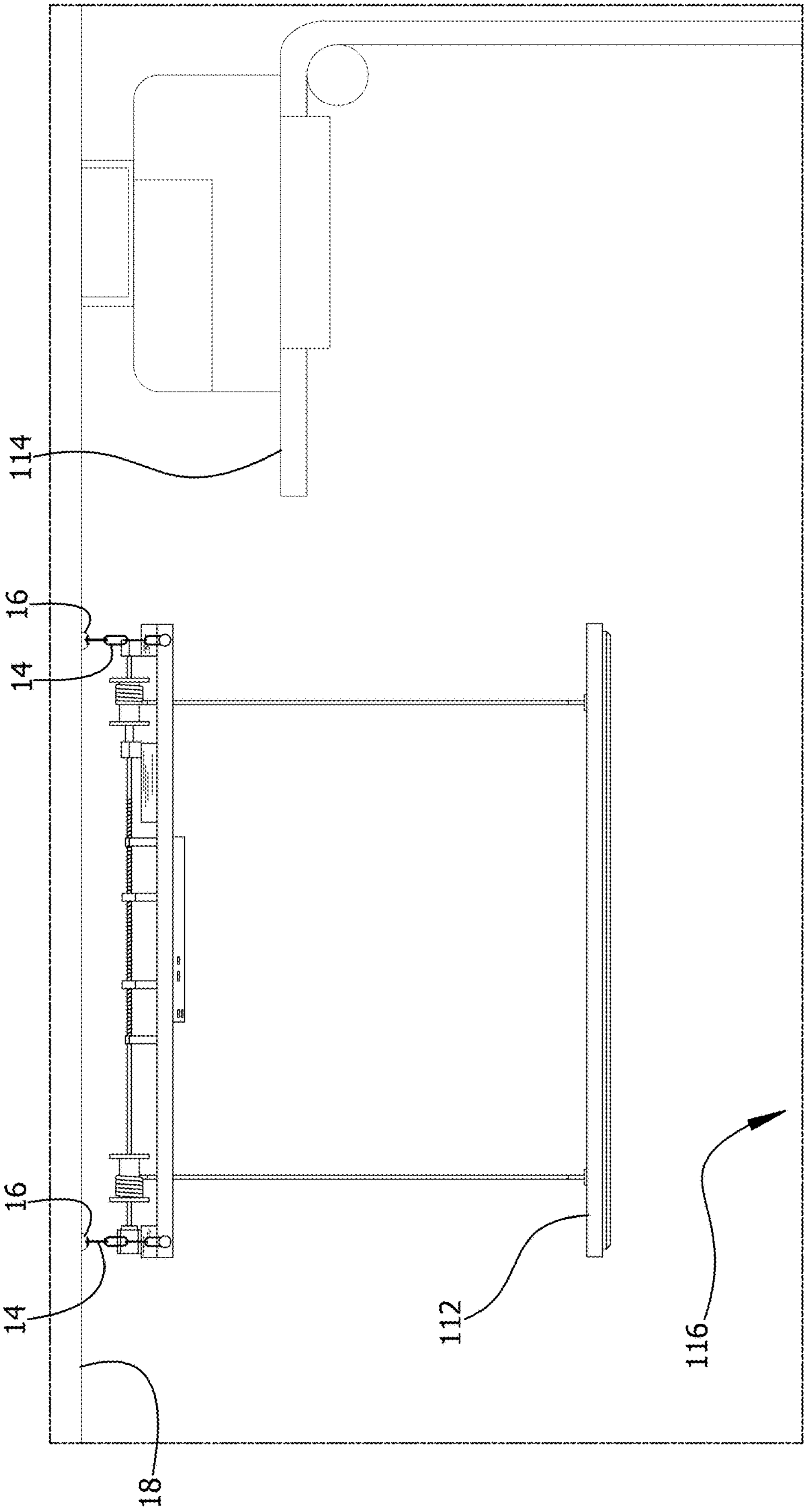
FIG. 5 is a perspective in-use view of an embodiment of the disclosure showing a light fixture being lowered from a support panel.
Figure 6:
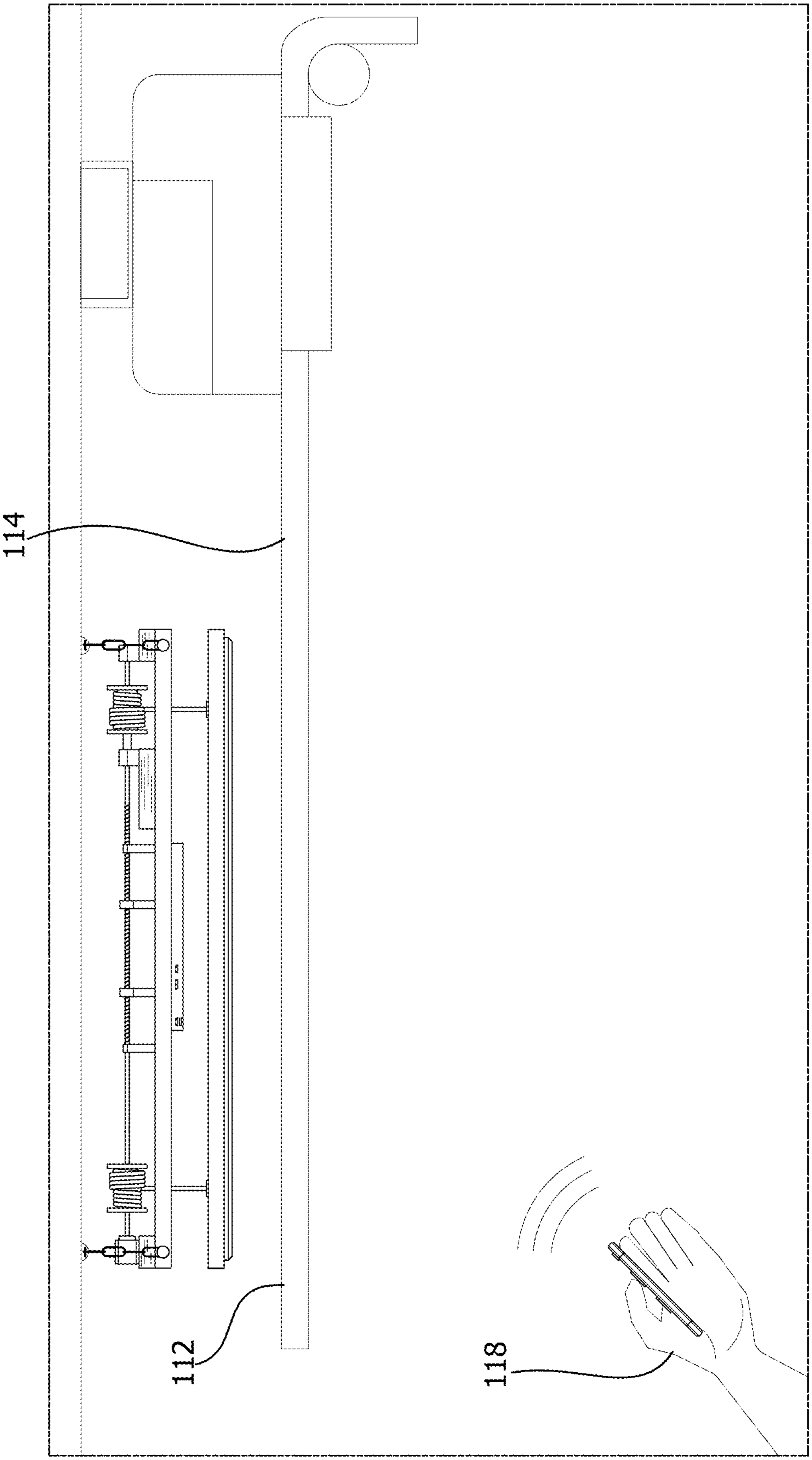
FIG. 6 is a perspective in-use view of an embodiment of the disclosure showing a light fixture being lifted toward a support panel.
Figure 7:
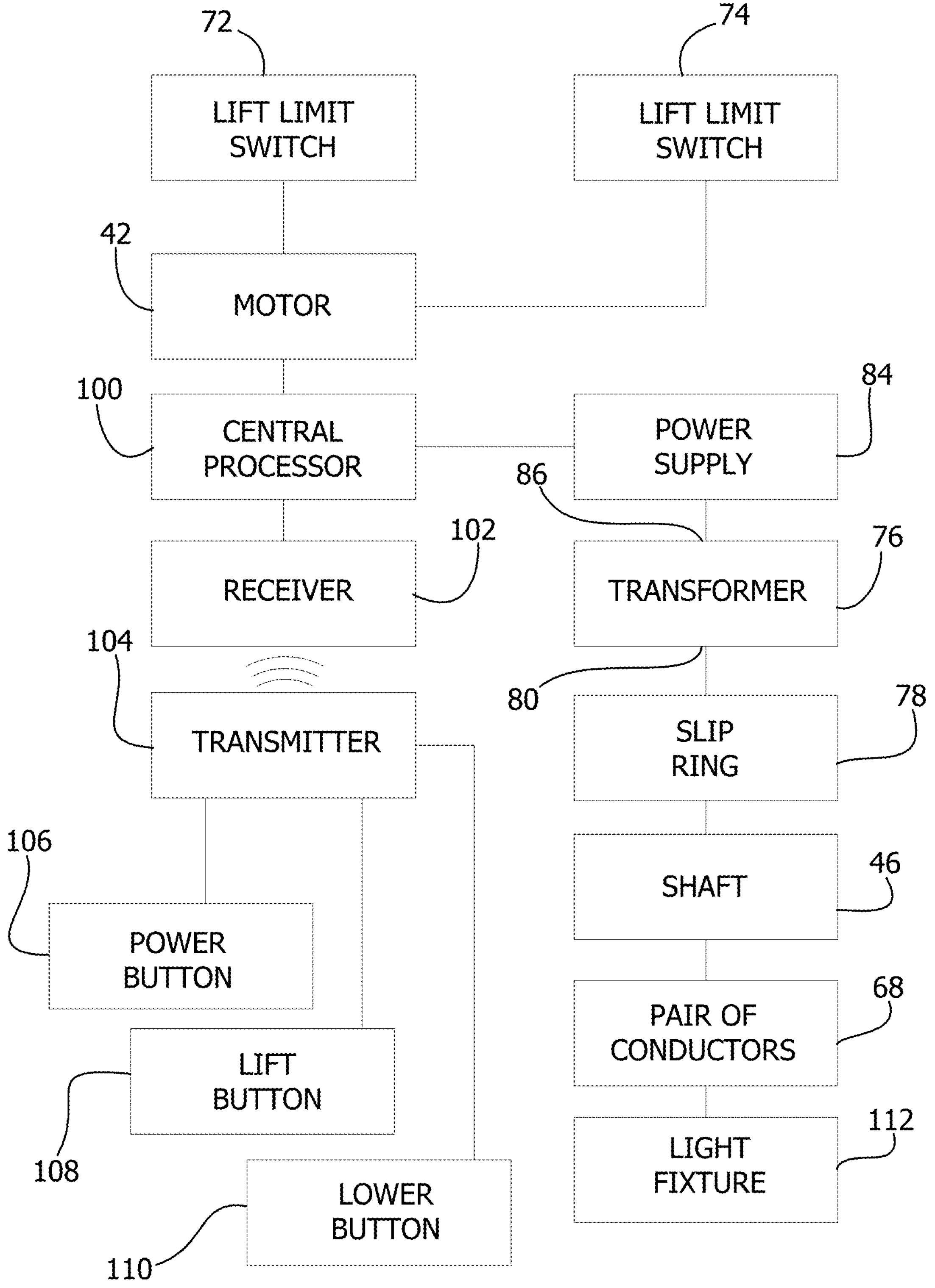
FIG. 7 is a schematic view of an embodiment of the disclosure.
Figure 8:
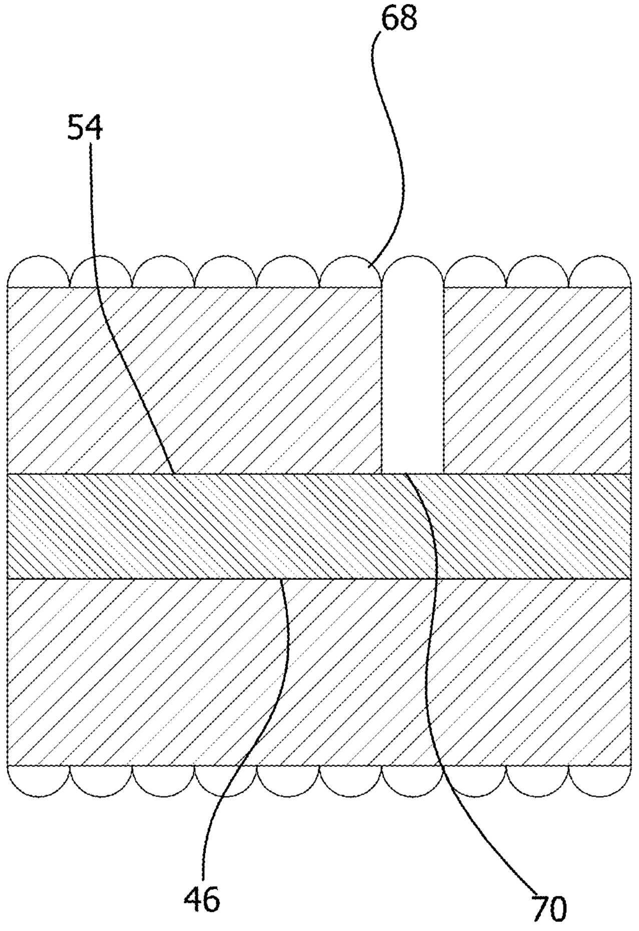
FIG. 8 is a cross sectional view taken along line 8-8 of FIG. 2 of an embodiment of the disclosure.

With reference now to the drawings, and in particular to FIGS. 1 through 8 thereof, a new light fixture device embodying the principles and concepts of an embodiment of the disclosure and generally designated by the reference numeral 10 will be described.

As best illustrated in FIGS. 1 through 8, the retractable light fixture 10 generally comprises support panel 12 which has a pair of suspensions 14 each attached to the support panel 12. Each of the suspensions 14 can be attached to a support 16 on a horizontal support surface 18 thereby enabling the support panel 12 to be suspended from the horizontal support surface 18. The horizontal support surface 18 may be a ceiling of a work area or other type of elevated support surface. Each of the pair of suspensions 14 has a first end 20 and a second end 22; the first end 20 of each of the pair of suspensions 14 is attached to a front edge 24 of the support panel 12 and the second end 22 of each of the pair of suspensions 14 is attached to a back edge 26 of the support panel 12. Furthermore, each of the pair of suspensions 14 is located adjacent to a respective one of a first end 28 and a second end 30 of the support panel 12. Each of the pair of suspensions 14 may comprise, but not be limited to, a chain or a cable or other type of resilient suspension that can support a weight of no less than 25.0 kg.

The support panel 12 has a pair of holes 32 each extending through a top surface 34 and a bottom surface 36 of the support panel 12. Each of the holes 32 is spaced from a respective one of the first end 28 and the second end 30 and the support panel 12 is elongated between the first end 28 and the second end 30. The support panel 12 has a channel 38 which is recessed into the top surface 34 and the channel 38 is elongated to extend a substantial distance between the pair of holes 32. Furthermore, the channel 38 is centrally located between the front edge 24 and the back edge 26 of the support panel 12.

A lifting unit 40 is rotatably attached to the support panel 12 and the lifting unit 40 is actuatable to rotate in either a first direction or a second direction. Additionally, the lifting unit 40 rotates a fixed number of rotations when the lifting unit 40 is actuated to rotate in the first direction. The lifting unit 40 rotates a fixed number or rotations when the lifting unit 40 is actuated to rotate in the second direction. The lifting unit 40 comprises a motor 42 which is mounted to the top surface 34 of the support panel 12. The motor 42 is located adjacent to the first end 28 of the support panel 12 and the motor 42 is actuatable to rotate in a first direction or a second direction. Additionally, the motor 42 may comprise a two direction electric motor or the like.

The lifting unit 40 includes a bearing 44 which is mounted to the top surface 34 of the support panel 12 and the bearing 44 is located adjacent to the second end 30 of the support panel 12. The bearing 44 may be a ball bearing or other type of friction reducing bearing. The lifting unit 40 includes a shaft 46 that has a coupled end 48 which is coupled to an output 50 of the motor 42 thereby enabling the motor 42 to rotate the shaft 46 in the first direction or the second direction when the motor 42 is actuated. Additionally, the shaft 46 has a free end 52 which rotatably engages the bearing 44 thereby enabling the shaft 46 to rotate about an axis is oriented parallel to the top surface 34 of the support panel 12. Furthermore, the shaft 46 is comprised of an electrically conductive material.

The lifting unit 40 includes a pair of spools 54 and each of the pair of spools 54 is positioned around the shaft 46 such that each of the pair of spools 54 rotates with the shaft 46. Each of the pair of spools 54 is located over a respective one of the pair of holes 32 in the support panel 12. The lifting unit 40 includes a screw 56 and the shaft 46 extends through the screw 56. The screw 56 is centrally located between the pair of spools 54 and the screw 56 is affixed to the shaft 46 such that the screw 56 rotates with the shaft 46. Additionally, the screw 56 has an outer surface 58 which is threaded.

The lifting unit 40 includes a pair of nuts 60 and each of the pair of nuts 60 is positioned around the screw 56 having each of the pair of nuts 60 threadably engaging the outer surface 58 of the screw 56. The pair of nuts 60 is spaced a strategic distance apart from each other on the screw 56. Additionally, each of the pair of nuts 60 includes a member 62 which is coupled to and extends downwardly from a respective nut 60 and which extends into the channel 38 in the top surface 34 of the support panel 12. In this way the member 62 on each of the pair of nuts 60 inhibits the pair of nuts 60 from rotating when the screw 56 is rotated. Each of the pair of nuts 60 travels along the screw 56 in a first direction when the screw 56 is rotated in the first direction. Conversely, each of the pair of nuts 60 travels along the screw 56 in a second direction when the screw 56 is rotated in the second direction. The pair of nuts 60 includes a lift nut 64 and a lower nut 66.

The lifting unit 40 includes a pair of conductors 68 and each of the pair of conductors 68 is wrapped around a respective one of the pair of spools 54. Each of the pair of conductors 68 is comprised of an electrically conductive material. Additionally, each of the pair of conductors 68 has a coupled end 70 which is electrically coupled to the shaft 46 such that each of the pair of conductors 68 is in electrical communication with the shaft 46. Each of the pair of conductors 68 extends downwardly through a respective one of the pair of holes 32 in the support panel 12. Each of the pair of conductors 68 is rolled around the respective spool 54 when the shaft 46 is rotated in the first direction. Conversely, each of the pair of conductors 68 is unrolled from the respective spool 54 when the shaft 46 is rotated in the second direction thereby enabling each of the pair of conductors 68 to be lowered through the respective hole 32 in the support panel 12.

The lifting unit 40 includes a lift limit switch 72 which is mounted to the top surface 34 of the support panel 12. The lift limit switch 72 is positioned beneath the shaft 46 at a point located adjacent to a respective one of the pair of spools 54 and the lift limit switch 72 is electrically coupled to the motor 42. The lift nut 64 travels toward the lift limit switch 72 when the screw 56 is rotated in the first direction. Furthermore, the lift limit switch 72 is actuated into an off condition when the lift nut 64 engages the lift limit switch 72 thereby de-actuating the motor 42 when the motor 42 is rotating in the first direction. The lift limit switch 72 is normally in an on condition when the lift nut 64 does not engage the lift limit switch 72 thereby enabling the motor 42 to be actuated to rotate in the first direction.

The lifting unit 40 includes a lower limit switch 74 which is mounted to the top surface 34 of the support panel 12. The lower limit switch 74 is positioned beneath the shaft 46 at a point located adjacent to a respective one of the pair of spools 54 and the lower limit switch 74 is electrically coupled to the motor 42. The lower nut 66 travels toward the lower limit switch 74 when the screw 56 is rotated in the second direction. Furthermore, the lower limit switch 74 is actuated into an off condition when the lower nut 66 engages the lower limit switch 74 thereby de-actuating the motor 42 when the motor 42 is rotating in the second direction. The lower limit switch 74 is normally in an on condition when the lower nut 66 does not engage the lower limit switch 74 thereby enabling the motor 42 to be actuated to rotate in the second direction.

The lifting unit 40 includes a transformer 76 which is mounted to the top surface 34 of the support panel 12 and the transformer 76 includes a slip ring 78 which extends upwardly from the transformer 76. The slip ring 78 is comprised of an electrically conductive material and the slip ring 78 is electrically coupled to an output 80 of the transformer 76. Furthermore, the shaft 46 extends through the slip ring 78 such that the shaft 46 is in electrical communication with the slip ring 78 thereby enabling the shaft 46 to be in electrical communication with the transformer 76. The lifting unit 40 includes an electronics housing 82 that is mounted to the bottom surface 36 of the support panel 12.

The lifting unit 40 includes a power supply 84 which is positioned within the electronics housing 82 and the power supply 84 is electrically coupled to an input 86 of the transformer 76. The power supply 84 includes a power cord 88 which extends away from the power supply 84 and the power cord 88 has a male plug 90 which is electrically coupled to a distal end 92 of the power cord 88. The male plug 90 can be electrically coupled to a power source 94 comprising a female electrical outlet.

A communication unit 96 is attached to the support panel 12 and the communication unit 96 is in communication with the lifting unit 40. Additionally, the communication unit 96 is in wireless communication with a remote control 98 thereby enabling the remote control 98 to remotely actuate the lifting unit 40 to rotate in either the first direction or the second direction. The communication unit 96 includes a control processor 100 which is located within the electronics housing 82 and the control processor 100 receiving a lift input, a lower input, an on input and an off input. The control processor 100 is electrically coupled to the power supply 84 and the control processor 100 is electrically coupled to the motor 42. The motor 42 is actuated to rotate in the first direction when the control processor 100 receives the lift input and the motor 42 is actuated to rotate in the second direction when the control processor 100 receives the lower input.

The communication unit 96 includes a receiver 102 which is located within the electronics housing 82. The receiver 102 is electrically coupled to the control processor 100 and the receiver 102 is in wireless communication with the remote control 98. The control processor 100 receives the lift input when the receiver 102 receives a lift command from the remote control 98 and the control processor 100 receives the lower input when the receiver 102 receives a lower command from the remote control 98. Additionally, the control processor 100 receives the on input when the receiver 102 receives an on command from the remote control 98 and the control processor 100 receives the off input when the receiver 102 receives an off command from the remote control 98. The receiver 102 may comprise a radio frequency receiver or the like and the remote control 98 may include a radio frequency transmitter 104 that is in wireless communication with the receiver 102. Additionally, the remote control 98 may include a power button 106 and a lift button 108 and a lower button 110. The control processor 100 may receive the on input and the off input when the power button 106 is depressed. Furthermore, the control processor 100 may receive the lift input when the lift button 108 is depressed and the control processor 100 may receive the lower input when the lower button 110 is depressed.

A light fixture 112 is attached to the lifting unit 40 and the light fixture 112 emits light outwardly from the light fixture 112 when the light fixture 112 is turned on. The light fixture 112 is lifted toward the support panel 12 when the lifting unit 40 is actuated to rotate in the first direction. In this way the light fixture 112 can be lifted to enable an overhead door 114 to travel beneath the light fixture 112 when the overhead door 114 is in an open position. The light fixture 112 is lowered away from the support panel 12 when the lifting unit 40 is actuated to rotate in the second direction. In this way the light fixture 112 can be positioned near a work area 116 thereby enabling the light fixture 112 to illuminate the work area 116 when the light fixture 112 is turned on. Thus, a user 118 with limited vision, such as an elderly user or a user with a visual disability, can enjoy improved vision in the work area 116 to enable the user 118 to perform work in the work area 116.

The light fixture 112 is attached to a distal end 120 of each of the pair of conductors 68 such that the light fixture 112 is suspended beneath the support panel 12. The light fixture 112 is electrically coupled to each of the pair of conductors 68 thereby enabling the light fixture 112 to be in electrical communication with the transformer 76 such that the transformer 76 supplies electrical power to the light fixture 112. Furthermore, the light fixture 112 may be in electrical communication with the control processor 100 via either a control conductor that is coextensive with a respective one of the pair of conductors 68 that is electrically coupled to the light fixture 112 or via electrical communication with the slip ring 78. The light fixture 112 is turned on when the control processor 100 receives the on input and the light fixture 112 is turned off when the control processor 100 receives the off input. The light fixture 112 includes a light emitter 122, such as a fluorescent light bulb, for example, or other type of electronic light emitter, which is disposed on a lower surface 124 of the light fixture 112.

In use, the suspensions 14 are attached to the horizontal support surface 18 to position the light fixture 112 in a desired location. The remote control 98 is employed to lower the light fixture 112 toward the work area 116 and to turn on the light fixture 112 to illuminate the work area 116. In this way the user 118 can enjoy a well illuminated work area 116 while performing work in the work area 116. The remote control 98 is employed to lift the light fixture 112 upwardly toward the horizontal support surface 18 to enable the overhead door 114 to be opened without striking the light fixture 112, for example, or to inhibit the light fixture 112 from impeding any other type of movable object that is located in the work area 116. Furthermore, the light fixture 112 can be turned on while the light fixture 112 is lifted against the support panel 12 or the light fixture 112 can be turned on while the light fixture 112 is lowered from the support panel 12. The remote control 98 includes an intensity adjustment to adjust the intensity of the light fixture 112 between a minimum intensity or a maximum intensity, depending on the user's preference.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A retractable light fixture device for either lowering or raising a light fixture with a remote control, said device comprising:

a support panel having a pair of suspensions each being attached to said support panel wherein each of said pair of suspensions is configured to be attached to a support on a horizontal support surface thereby enabling said support panel to be suspended from the horizontal support surface;

a lifting unit being rotatably attached to said support panel, said lifting unit being actuatable to rotate in either a first direction or a second direction, said lifting unit rotating a fixed number of rotations when said lifting unit is actuated to rotate in said first direction, said lifting unit rotating a fixed number or rotations when said lifting unit is actuated to rotate in said second direction;

a communication unit being attached to said support panel, said communication unit being in communication with said lifting unit, said communication unit being in wireless communication with a remote control thereby enabling said remote control to remotely actuate said lifting unit to rotate in either said first direction or said second direction;

a light fixture being attached to said lifting unit wherein said light fixture is configured to emit light outwardly from said light fixture when said light fixture is turned on, said light fixture being lifted toward said support panel when said lifting unit is actuated to rotate in said first direction wherein said light fixture is configured to be lifted to enable an overhead door to travel beneath said light fixture when the overhead door is in an open position, said light fixture being lowered away from said support panel when said lifting unit is actuated to rotate in said second direction wherein said light fixture is configured to be positioned near a work area thereby enabling said light fixture to illuminate the work area when said light fixture is turned on;

wherein each of said pair of suspensions has a first end and a second end;

wherein said first end of each of said pair of suspensions is attached to a front edge of said support panel;

wherein said second end of each of said pair of suspensions is attached to a back edge of said support panel;

wherein each of said pair of suspensions is located adjacent to a respective one of a first end and a second end of said support panel;

wherein said support panel has a pair of holes each extending through a top surface and a bottom surface of said support panel;

wherein each of said holes is spaced from a respective one of said first end and said second end;

wherein said support panel is elongated between said first end and said second end;

wherein said support panel has a channel being recessed into said top surface;

wherein said channel is elongated to extend a substantial distance between said pair of holes; and wherein said channel is centrally located between said front edge and said back edge of said support panel.

2. The retractable light fixture device according to claim 1, wherein:

said lifting unit includes a motor being mounted to said top surface of said support panel;

said motor is located adjacent to said first end of said support panel;

said motor is actuatable to rotate in a first direction or a second direction;

said lifting unit includes a bearing being mounted to said top surface of said support panel;

said bearing is located adjacent to said second end of said support panel;

said lifting unit includes a shaft having a coupled end being coupled to an output of said motor thereby enabling said motor to rotate said shaft in said first direction or said second direction when said motor is actuated;

said shaft having a free end which rotatably engages said bearing thereby enabling said shaft to rotate about an axis being oriented parallel to said top surface of said support panel;

said shaft is comprised of an electrically conductive material;

said lifting unit includes a pair of spools;

each of said pair of spools is positioned around said shaft such that each of said pair of spools rotates with said shaft;

each of said pair of spools is located over a respective one of said pair of holes in said support panel;

said lifting unit includes a screw having said shaft extending through said screw;

said screw is centrally located between said pair of spools;

said screw is affixed to said shaft such that said screw rotates with said shaft;

said screw has an outer surface being threaded;

said lifting unit includes a pair of nuts;

each of said pair of nuts is positioned around said screw having each of said pair of nuts threadably engaging said outer surface of said screw;

said pair of nuts is spaced a strategic distance apart from each other on said screw;

each of said pair of nuts includes a member which is coupled to and extends downwardly from a respective nut and which extends into said channel in said top surface of said support panel such that said member on each of said pair of nuts inhibits said pair of nuts from rotating when said screw is rotated;

each of said pair of nuts travels along said screw in a first direction when said screw is rotated in said first direction;

each of said pair of nuts travels along said screw in a second direction when said screw is rotated in said second direction; and said pair of nuts includes a lift nut and a lower nut.

3. The retractable light fixture device according to claim 2, wherein:

said lifting unit includes a pair of conductors;

each of said pair of conductors is wrapped around a respective one of said pair of spools;

each of said pair of conductors is comprised of an electrically conductive material;

each of said pair of conductors has a coupled end being electrically coupled to said shaft such that each of said pair of conductors is in electrical communication with said shaft;

each of said pair of conductors extends downwardly through a respective one of said pair of holes in said support panel;

each of said pair of conductors is rolled around said respective spool when said shaft is rotated in said first direction; and each of said pair of conductors is unrolled from said respective spool when said shaft is rotated in said second direction thereby enabling each of said pair of conductors to be lowered through said respective hole in said support panel.

4. The retractable light fixture device according to claim 2, wherein:

said lifting unit includes a lift limit switch being mounted to said top surface of said support panel;

said lift limit switch is positioned beneath said shaft at a point located adjacent to a respective one of said pair of spools;

said lift limit switch is electrically coupled to said motor;

said lift nut travels toward said lift limit switch when said screw is rotated in said first direction;

said lift limit switch is actuated into an off condition when said lift nut engages said lift limit switch thereby de-actuating said motor when said motor is rotating in said first direction; and said lift limit switch is normally in an on condition when said lift nut does not engage said lift limit switch thereby enabling said motor to be actuated to rotate in said first direction.

5. The retractable light fixture device according to claim 2, wherein:

said lifting unit includes a lower limit switch being mounted to said top surface of said support panel;

said lower limit switch is positioned beneath said shaft at a point located adjacent to a respective one of said pair of spools;

said lower limit switch is electrically coupled to said motor;

said lower nut travels toward said lower limit switch when said screw is rotated in said second direction;

said lower limit switch is actuated into an off condition when said lower nut engages said lower limit switch thereby de-actuating said motor when said motor is rotating in said second direction; and said lower limit switch is normally in an on condition when said lower nut does not engage said lower limit switch thereby enabling said motor to be actuated to rotate in said second direction.

6. A retractable light fixture device for either lowering or raising a light fixture with a remote control, said device comprising:

a support panel having a pair of suspensions each being attached to said support panel wherein each of said pair of suspensions is configured to be attached to a support on a horizontal support surface thereby enabling said support panel to be suspended from the horizontal support surface;

a lifting unit being rotatably attached to said support panel, said lifting unit being actuatable to rotate in either a first direction or a second direction, said lifting unit rotating a fixed number of rotations when said lifting unit is actuated to rotate in said first direction, said lifting unit rotating a fixed number or rotations when said lifting unit is actuated to rotate in said second direction;

a communication unit being attached to said support panel, said communication unit being in communication with said lifting unit, said communication unit being in wireless communication with a remote control thereby enabling said remote control to remotely actuate said lifting unit to rotate in either said first direction or said second direction;

a light fixture being attached to said lifting unit wherein said light fixture is configured to emit light outwardly from said light fixture when said light fixture is turned on, said light fixture being lifted toward said support panel when said lifting unit is actuated to rotate in said first direction wherein said light fixture is configured to be lifted to enable an overhead door to travel beneath said light fixture when the overhead door is in an open position, said light fixture being lowered away from said support panel when said lifting unit is actuated to rotate in said second direction wherein said light fixture is configured to be positioned near a work area thereby enabling said light fixture to illuminate the work area when said light fixture is turned on;

wherein said lifting unit includes a shaft being comprised of an electrically conductive material;

wherein said lifting unit includes a transformer being mounted to a top surface of said support panel;

wherein said transformer includes a slip ring extending upwardly from said transformer;

wherein said slip ring is comprised of an electrically conductive material;

wherein said slip ring is electrically coupled to an output of said transformer; and wherein said shaft extends through said slip ring such that said shaft is in electrical communication with said slip ring thereby enabling said shaft to be in electrical communication with said transformer.

7. The retractable light fixture device according to claim 6, wherein:

said lifting unit includes an electronics housing being mounted to said bottom surface of said support panel;

said lifting unit includes a power supply being positioned within said electronics housing;

said power supply is electrically coupled to an input of said transformer;

said power supply includes a power cord extending away from said power supply; and said power cord has a male plug being electrically coupled to a distal end of said power cord wherein said male plug is configured to be electrically coupled to a power source comprising a female electrical outlet.

8. The retractable light fixture device according to claim 7, wherein:

said lifting unit includes a motor;

said communication unit includes a control processor being located within said electronics housing;

said control processor receives a lift input and a lower input and an on input and an off input;

said control processor is electrically coupled to said power supply;

said control processor is electrically coupled to said motor;

said motor is actuated to rotate in a first direction when said control processor receives said lift input;

said motor is actuated to rotate in a second direction when said control processor receives said lower input;

said communication unit includes a receiver being located within said electronics housing;

said receiver is electrically coupled to said control processor;

said receiver is in wireless communication with said remote control;

said control processor receives said lift input when said receiver receives a lift command from said remote control;

said control processor receives said lower input when said receiver receives a lower command from said remote control;

said control processor receives said on input when said receiver receives an on command from said remote control; and said control processor receiving said off input when said receiver receives an off command from said remote control.

9. The retractable light fixture device according to claim 8, wherein:

said lifting unit includes a pair of conductors;

each of said pair of conductors is in electrical communication with said transformer;

said light fixture is attached to a distal end of each of said pair of conductors such that said light fixture is suspended beneath said support panel;

said light fixture is electrically coupled to each of said pair of conductors thereby enabling said light fixture to be in electrical communication with said transformer such that said transformer supplies electrical power to said light fixture;

said light fixture is in electrical communication with said control processor;

said light fixture is turned on when said control processor receives said on input; and said light fixture is turned off when said control processor receives said off input.

10. A retractable light fixture device for either lowering or raising a light fixture with a remote control, said device comprising:

a support panel having a pair of suspensions each being attached to said support panel wherein each of said pair of suspensions is configured to be attached to a support on a horizontal support surface thereby enabling said support panel to be suspended from the horizontal support surface, each of said pair of suspensions having a first end and a second end, said first end of each of said pair of suspensions being attached to a front edge of said support panel, said second end of each of said pair of suspensions being attached to a back edge of said support panel, each of said pair of suspensions being located adjacent to a respective one of a first end and a second end of said support panel, said support panel having a pair of holes each extending through a top surface and a bottom surface of said support panel, each of said holes being spaced from a respective one of said first end and said second end, said support panel being elongated between said first end and said second end, said support panel having a channel being recessed into said top surface, said channel being elongated to extend a substantial distance between said pair of holes, said channel being centrally located between said front edge and said back edge of said support panel;

a lifting unit being rotatably attached to said support panel, said lifting unit being actuatable to rotate in either a first direction or a second direction, said lifting unit rotating a fixed number of rotations when said lifting unit is actuated to rotate in said first direction, said lifting unit rotating a fixed number or rotations when said lifting unit is actuated to rotate in said second direction, said lifting unit comprising:

a motor being mounted to said top surface of said support panel, said motor being located adjacent to said first end of said support panel, said motor being actuatable to rotate in a first direction or a second direction;

a bearing being mounted to said top surface of said support panel, said bearing being located adjacent to said second end of said support panel;

a shaft having a coupled end being coupled to an output of said motor thereby enabling said motor to rotate said shaft in said first direction or said second direction when said motor is actuated, said shaft having a free end which rotatably engages said bearing thereby enabling said shaft to rotate about an axis being oriented parallel to said top surface of said support panel, said shaft being comprised of an electrically conductive material;

a pair of spools, each of said pair of spools being positioned around said shaft such that each of said pair of spools rotates with said shaft, each of said pair of spools being located over a respective one of said pair of holes in said support panel;

a screw having said shaft extending through said screw, said screw being centrally located between said pair of spools, said screw being affixed to said shaft such that said screw rotates with said shaft, said screw having an outer surface being threaded;

a pair of nuts, each of said pair of nuts being positioned around said screw having each of said pair of nuts threadably engaging said outer surface of said screw, said pair of nuts being spaced a strategic distance apart from each other on said screw, each of said pair of nuts including a member which is coupled to and extends downwardly from a respective nut and which extends into said channel in said top surface of said support panel such that said member on each of said pair of nuts inhibits said pair of nuts from rotating when said screw is rotated, each of said pair of nuts traveling along said screw in a first direction when said screw is rotated in said first direction, each of said pair of nuts travelling along said screw in a second direction when said screw is rotated in said second direction, said pair of nuts including a lift nut and a lower nut;

a pair of conductors, each of said pair of conductors being wrapped around a respective one of said pair of spools, each of said pair of conductors being comprised of an electrically conductive material, each of said pair of conductors having a coupled end being electrically coupled to said shaft such that each of said pair of conductors is in electrical communication with said shaft, each of said pair of conductors extending downwardly through a respective one of said pair of holes in said support panel, each of said pair of conductors being rolled around said respective spool when said shaft is rotated in said first direction, each of said pair of conductors being unrolled from said respective spool when said shaft is rotated in said second direction thereby enabling each of said pair of conductors to be lowered through said respective hole in said support panel;

a lift limit switch being mounted to said top surface of said support panel, said lift limit switch being positioned beneath said shaft at a point located adjacent to a respective one of said pair of spools, said lift limit switch being electrically coupled to said motor, said lift nut traveling toward said lift limit switch when said screw is rotated in said first direction, said lift limit switch being actuated into an off condition when said lift nut engages said lift limit switch thereby de-actuating said motor when said motor is rotating in said first direction, said lift limit switch being normally in an on condition when said lift nut does not engage said lift limit switch thereby enabling said motor to be actuated to rotate in said first direction;

a lower limit switch being mounted to said top surface of said support panel, said lower limit switch being positioned beneath said shaft at a point located adjacent to a respective one of said pair of spools, said lower limit switch being electrically coupled to said motor, said lower nut traveling toward said lower limit switch when said screw is rotated in said second direction, said lower limit switch being actuated into an off condition when said lower nut engages said lower limit switch thereby de-actuating said motor when said motor is rotating in said second direction, said lower limit switch being normally in an on condition when said lower nut does not engage said lower limit switch thereby enabling said motor to be actuated to rotate in said second direction;

a transformer being mounted to said top surface of said support panel, said transformer including a slip ring extending upwardly from said transformer, said slip ring being comprised of an electrically conductive material, said slip ring being electrically coupled to an output of said transformer, said shaft extending through said slip ring such that said shaft is in electrical communication with said slip ring thereby enabling said shaft to be in electrical communication with said transformer;

an electronics housing being mounted to said bottom surface of said support panel;

a power supply being positioned within said electronics housing, said power supply being electrically coupled to an input of said transformer, said power supply including a power cord extending away from said power supply, said power cord having a male plug being electrically coupled to a distal end of said power cord wherein said male plug is configured to be electrically coupled to a power source comprising a female electrical outlet;

a communication unit being attached to said support panel, said communication unit being in communication with said lifting unit, said communication unit being in wireless communication with a remote control thereby enabling said remote control to remotely actuate said lifting unit to rotate in either said first direction or said second direction, said communication unit comprising:

a control processor being located within said electronics housing, said control processor receiving a lift input and a lower input and an on input and an off input, said control processor being electrically coupled to said power supply, said control processor being electrically coupled to said motor, said motor being actuated to rotate in said first direction when said control processor receives said lift input, said motor being actuated to rotate in said second direction when said control processor receives said lower input; and a receiver being located within said electronics housing, said receiver being electrically coupled to said control processor, said receiver being in wireless communication with said remote control, said control processor receiving said lift input when said receiver receives a lift command from said remote control, said control processor receiving said lower input when said receiver receives a lower command from said remote control, said control processor receiving said on input when said receiver receives an on command from said remote control, said control processor receiving said off input when said receiver receives an off command from said remote control; and a light fixture being attached to said lifting unit wherein said light fixture is configured to emit light outwardly from said light fixture when said light fixture is turned on, said light fixture being lifted toward said support panel when said lifting unit is actuated to rotate in said first direction wherein said light fixture is configured to be lifted to enable an overhead door to travel beneath said light fixture when the overhead door is in an open position, said light fixture being lowered away from said support panel when said lifting unit is actuated to rotate in said second direction wherein said light fixture is configured to be positioned near a work area thereby enabling said light fixture to illuminate the work area when said light fixture is turned on, said light fixture being attached to a distal end of each of said pair of conductors such that said light fixture is suspended beneath said support panel, said light fixture being electrically coupled to each of said pair of conductors thereby enabling said light fixture to be in electrical communication with said transformer such that said transformer supplies electrical power to said light fixture, said light fixture being in electrical communication with said control processor, said light fixture being turned on when said control processor receives said on input, said light fixture being turned off when said control processor receives said off input.

* * * * *